(12) United States Patent
Paramasivam et al.

(10) Patent No.: US 7,657,746 B2
(45) Date of Patent: Feb. 2, 2010

(54) SUPPORTING STATEMENTS FOR CREDENTIAL BASED ACCESS CONTROL

(75) Inventors: Muthukrishnan Paramasivam, Seattle, WA (US); Charles F Rose, III, Redmond, WA (US); Nicolas Payette, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/112,993

(22) Filed: Apr. 22, 2005

(65) Prior Publication Data

US 2006/0242688 A1 Oct. 26, 2006

(51) Int. Cl.
H04L 9/32 (2006.01)
G06F 7/04 (2006.01)

(52) U.S. Cl. .............................. 713/168; 726/5; 726/17
(58) Field of Classification Search .................. 706/5; 726/5, 17; 713/168
See application file for complete search history.

(56) References Cited

U.S. PATENT DOCUMENTS

| | | | |
|---|---|---|---|
| 5,958,050 A * | 9/1999 | Griffin et al. .................. 726/1 |
| 6,647,388 B2 * | 11/2003 | Numao et al. .................. 707/9 |
| 7,024,392 B2 * | 4/2006 | Stefik et al. .................. 705/51 |
| 7,024,693 B2 * | 4/2006 | Byrne .......................... 726/21 |
| 7,085,925 B2 * | 8/2006 | Hanna et al. ................ 713/157 |
| 7,219,154 B2 * | 5/2007 | Blakley et al. ............... 709/229 |
| 7,222,362 B1 * | 5/2007 | Canetti et al. ................. 726/5 |
| 7,246,370 B2 * | 7/2007 | Valente et al. ................. 726/1 |
| 7,249,369 B2 * | 7/2007 | Knouse et al. ................. 726/1 |
| 7,260,831 B1 * | 8/2007 | Beznosov et al. .............. 726/2 |
| 7,536,712 B2 * | 5/2009 | Kaler et al. .................... 726/5 |
| 7,587,491 B2 * | 9/2009 | Hinton ....................... 709/225 |
| 2001/0018675 A1 * | 8/2001 | Blaze et al. .................... 705/35 |
| 2002/0049912 A1 * | 4/2002 | Honjo et al. .................. 713/201 |
| 2002/0087859 A1 * | 7/2002 | Weeks et al. ................. 713/156 |
| 2002/0178271 A1 * | 11/2002 | Graham et al. ............... 709/229 |
| 2003/0126464 A1 * | 7/2003 | McDaniel et al. ............ 713/201 |
| 2004/0015723 A1 * | 1/2004 | Pham et al. .................. 713/201 |
| 2004/1001572 * | 1/2004 | Pham et al. .................. 713/201 |
| 2004/0073668 A1 * | 4/2004 | Bhat et al. ................... 709/225 |
| 2004/0088578 A1 * | 5/2004 | Chao et al. .................. 713/201 |
| 2004/0148514 A1 * | 7/2004 | Fee et al. .................... 713/200 |
| 2004/0167984 A1 * | 8/2004 | Herrmann ................... 709/229 |
| 2004/0177276 A1 * | 9/2004 | MacKinnon et al. ........ 713/201 |
| 2004/0243835 A1 * | 12/2004 | Terzis et al. ................ 713/200 |
| 2005/0154795 A1 * | 7/2005 | Kuz et al. .................... 709/227 |
| 2005/0193196 A1 * | 9/2005 | Huang et al. ................ 713/166 |
| 2005/0283443 A1 * | 12/2005 | Hardt .......................... 705/67 |
| 2006/0026667 A1 * | 2/2006 | Bhide et al. .................... 726/1 |

(Continued)

OTHER PUBLICATIONS

A Proof-Carrying Authorization System Lujo Bauer Michael A. Schneider Edward W. Felten Secure Internet Programming Laboratory Department of Computer Science Princeton University Tech Report TR-638-01 Apr. 30, 2001.*

(Continued)

*Primary Examiner*—Matthew B Smithers
*Assistant Examiner*—Techane J Gergiso
(74) *Attorney, Agent, or Firm*—Wolf, Greenfield & Sacks, P.C.

(57) ABSTRACT

Supporting statements are provided to help safely and efficiently construct and verify proofs necessary for deciding whether to grant a request from one entity for accessing a resource owned or administered by another entity.

11 Claims, 6 Drawing Sheets

U.S. PATENT DOCUMENTS

| | | | |
|---|---|---|---|
| 2006/0053276 A1* | 3/2006 | Lortz et al. | 713/2 |
| 2006/0053296 A1* | 3/2006 | Busboom et al. | 713/182 |
| 2006/0069668 A1* | 3/2006 | Braddy et al. | 707/2 |
| 2006/0075463 A1* | 4/2006 | Braddy et al. | 726/1 |
| 2006/0150238 A1* | 7/2006 | D'Agostino | 726/1 |
| 2006/0236382 A1* | 10/2006 | Hinton et al. | 726/8 |

OTHER PUBLICATIONS

Cassandra: Distributed Access Control Policies with Tunable Expressiveness Moritz Y. Becker Peter Sewell Computer Laboratory, University of Cambridge JJ Thomson Avenue, Cambridge, United Kingdom {moritz.becker, peter.sewell}@cl.cam.ac.uk Proceedings of the Fifth IEEE International Workshop on Policies for Distributed Systems and Networks (Poli.*

Adaptive Trust Negotiation and Access Control Tatyana Ryutov, Li Zhou, and Clifford Neuman Information Sciences Institute University of Southern California Marina del Rey, CA 90292-6695 Travis Leithead, Kent E. Seamons Internet Security Research Lab Brigham Young University Provo, UT 84602-6576.*

Distributed Proving in Access-Control Systems Lujo Bauer Scott Garriss Michael K. Reiter Proceedings of the 2005 IEEE Symposium on Security and Privacy (S&P'05) 1081-6011/05 $ 20.00 IEEE.*

Beyond Proof-of-Compliance: Security Analysis in Trust Management Ninghui Li Purdue University, West Lafayette, Indiana John C. Mitchell Stanford University, Stanford, California and William H. Winsborough George Mason University, Fairfax, Virginia Journal of the ACM, vol. 52, No. 3, May 2005, pp. 474-514.*

Joint Policy Management and Auditing in Virtual Organizations Timothy J. Smith and Lavanya Ramakrishnan MCNC-RDI Research and Development Institute 3021 Cornwallis Road, PO Box 13910, Research Triangle Park, NC 27709-2889 Proceedings of the Fourth International Workshop on Grid Computing (Grid'03) 0-7695-2026-X/03 $ 17.00 © 2003 IEEE.*

A Proof-Carrying Authorization System Lujo Bauer Michael A. Schneider Edward W. Felten Secure Internet Programming Laboratory Department of Computer Science Princeton University Tech Report TR-638-01 Apr. 30, 2001.*

Cassandra: Distributed Access Control Policies with Tunable Expressiveness Moritz Y. Becker Peter Sewell Computer Laboratory, University of Cambridge JJ Thomson Avenue, Cambridge, United Kingdom {moritz.becker, peter.sewell}@cl.cam.ac.uk Proceedings of the Fifth IEEE International Workshop on Policies for Distributed Systems and Networks (Poli.*

Adaptive Trust Negotiation and Access Control Tatyana Ryutov, Li Zhou, and Clifford Neuman Information Sciences Institute University of Southern California Marina del Rey, CA 90292-6695 Travis Leithead, Kent E. Seamons Internet Security Research Lab Brigham Young University Provo, UT 84602-6576.*

Distributed Proving in Access-Control Systems Lujo Bauer Scott Garriss Michael K. Reiter Proceedings of the 2005 IEEE Symposium on Security and Privacy (S&P'05) 1081-6011/05 $ 20.00 IEEE.*

Ting Yu, Automated Trust Establishment in Open Systems, Year of Publication: 2003, University of Illinois at Urbana-Champaign Champaign, IL, USA, pp. 1-185.*

Bauer, L., et al., "A Proof-Carrying Authorization System," Technical Report TR-638-01, Princeton University, Apr. 30, 2001.

* cited by examiner

USE POLICY STATEMENT

1. Contosa.com says "X can access the Contosa.com web service if X is a gold star member authorized by Fabrikam.com"

CREDENTIAL STATEMENTS

2. Fabrikam.com says "X can issue gold star member certifications if X is a Fabrikam.com partner" ~ 300A
3. Fabrikam.com says "Acme.com is a Fabrikam.com partner" ~ 300B
4. Acme.com says "Parama is a gold star member" ~ 300C

SUPPORTING STATEMENTS FOR CREDENTIAL BASED ACCESS CONTROL

FIELD OF THE INVENTION

The present invention relates generally to access control, and more particularly to credential-based access control in a distributed access control system.

BACKGROUND OF THE INVENTION

A computing environment may contain a variety of entities and resources. Entities may include users, operating systems, applications, processes, threads, objects, etc. Resources may include information, files, network connections, properties and methods of objects, etc. Generally, when one entity ("client") wants to access a resource owned or administered by another entity ("server"), the client issues an access request to the server. The server may use a program that manages the resource ("resource manager") to decide whether to grant the access request. The decision process is usually called an access control process. The resource manager may make the decision by consulting pre-configured access policies for the resource ("use policy"). The resource manager, the resource, and the associated use policy may be considered as parts of the server. The resource manager and the associated use policy constitute an access control system.

Traditional access control systems tend to be static and closed with regard to which entity can access a resource. In such access control systems, a client typically is an authenticated entity that is locally known to the server, and information needed to make a decision is usually available locally on the server. As a result, the server needs to administer the entire complexity of access control locally and cannot delegate some of the administration work to other entities.

The development of distributed and dynamic computing environments, such as the Internet, has made static and closed access control systems inadequate. For example, an entity that is not locally known to a server may request to access a resource on the server. The entity may provide information for the resource manager to use during its decision process. The information provided by an entity can be a reply to a proposition from the server that requests the entity to prove before granting the entity the requested access. Such a reply is also called a proof. The entity may supply credential statements along with the access request. The credential statements provide information to identify who the entity is. The credential statements may include more than authentication information used to help determine who the entity is. The credential statements may also include additional policy statements. Because the authenticity and integrity of policy statements can be secured with current cryptographic technologies, an owner of a resource may remotely author policy statements and provide the policy statements to a client. The client can then present the policy statements to the resource manager of the resource. The resource manager may then check the veracity of the policy statements and consult with the owner of the resource. The resource manager may eventually provide access in a manner consistent with the resource owner's intent as expressed in the policy statements.

The ability to configure policy remotely through cryptographically protected statements provides many opportunities for an access control system to depart from the traditional closed and static model. For example, a client may bring a statement authored by an entity that certifies the client to be a member of a pre-determined group. The client may also bring a statement authored by the resource owner, saying that members of the group, according to the entity, may access the resource. Together, these statements imply that the client should be able to access the resource. In such an example, the resource manager may have no prior knowledge of the entity that certifies the client to be a member of the authenticated group. The resource manager also may not know a priori that the resource owner has delegated the certifying ability to the entity only for the purpose of this specific access control decision.

Certain approaches, such as ISO Rights Expression Language (XrML 2.x) and Delegation Logic, represent statements in a logical form so that the access control decision can be computed symbolically from the statements themselves. More specifically, these approaches have their basis in predicate calculus, and their computing process on whether access should be granted according to the owner's intent is equivalent to finding a proof The proof-based approach has several advantages. The most important advantage is that it provides a mathematically verifiable reason why access ought to be granted. Another advantage is that there is no need to translate the meaning of the expression to some other form to uncover the owner's intent; reasoning can be done at the expression level itself.

To enable diverse delegation scenarios, a resource manager needs to process the statements provided by clients and decide whether or not to grant the requested access. To allow for multiple statements to imply access in a scalable and manageable fashion, a resource manager needs to reason with the underlying meaning and intent inherent in the statements supplied by a client. Such a reasoning process may be called "computing the proof" or "theorem proving."

However, the process of theorem proving can become cumbersome. Declarative authorization systems are closely aligned with declarative programming languages, such as Prolog. Theorem proving is computationally equivalent to the imperative semantics of more common programming systems like C++, C#, or Java. As such, theorem proving can be used to encode arbitrary computation problems, i.e. arbitrary computer programs. As such, theoretical limitations exist as to how fast proofs can be computed. For example, for full predicate calculus, in the worst case, no existing algorithm can guarantee to terminate when computing proofs just as there exist questions that cannot be answered in C++, C#, etc. As a result, a decision on access control may never be reached for this class of problems. The open ending may expose a resource manager to adversary attacks. For example, a client can build bogus assertions to severely task a resource manager into computing proofs, including constructing proofs of unbounded size. The bogus assertions may also induce a resource manager to spend an unbounded amount of time and/or space in order to conclude the nonexistence of a proof. When a resource manager enters endless computation, the resource manager has to deny services to other entities. Such situations are called denial of service attacks, which can interrupt network routing services and render networks inoperable.

Therefore, there exists a need to relieve a resource manager's onerous computing of proofs so as to avoid the negative consequences, such as denial of service attacks, brought by endless computing.

SUMMARY OF THE INVENTION

The invention addresses the above-identified need by providing supporting statements, i.e., additional assertions that help to construct a proof for safe and efficient verification.

The additional assertions enable a resource manager to examine and verify a proof instead of computing a proof.

One aspect of the invention provides a system comprising a server component, a client component, and one or more supporting statements, i.e., additional assertions. The server component is any entity that owns or administers a resource. The resource is associated with a use policy that dictates who can access the resource. The client component is any entity that requests to access the resource. The system may be supplemented by one or more entities ("auxiliary clients"). The client component and/or the auxiliary clients supply information such as credential statements and/or additional assertions to the server component. The credential statements identify who the client component is. The credential statements may also include authorization statements supplied by any of the auxiliary clients such as statements certifying that the client component is a member of a pre-determined group. The client component may not be a trusted entity for the server component. As long as the server component can verify that the proof resulting from information supplied by the client component is correct, the server component will grant the client component the requested access.

The one or more assertions are used to instruct how to construct a proof to demonstrate that the client component should be granted the requested access. The one or more assertions may be supplied by the server component and used by the client component to construct a proof demonstrating that the requested access should be granted. Alternatively, the client component may supply one or more assertions and credential statements to the server component, which then constructs a proof to demonstrate that the access request should be granted. An assertion may assign a value to a variable or prove a prerequisite clause in one of the credential or use policy statements. In accordance with one aspect of the invention, the one or more assertions may instruct how to construct only part of, instead of the entire proof that is necessary to decide whether the requested access should be granted or not.

Another aspect of the invention provides a method where a server component sends a client component a proposition upon receiving an access request from the client component. The proposition includes additional assertions that help the client component to construct a proof demonstrating that the client should be granted the requested access.

A further aspect of the invention provides a method where a client component sends an access request to a server component, along with credential statements and additional assertions. The additional assertions instruct the server component on how to use the credential statements to derive a conclusion on whether to grant the requested access.

Regardless of whether it is the client component or the server component that supplies the additional assertions, the server component will examine the proof resulting from applying the additional assertions and decide whether the proof is correct. If the proof is correct, the access request will be granted. Otherwise, the access request will be denied. In summary, the invention mitigates the problem presented by onerous computing of proofs by presenting supporting statements, i.e., additional assertions that help to safely and efficiently construct and verify proofs. Consequently, the invention reduces a resource manager's task to simply checking the validity of a proof, instead of computing the proof to decide whether to grant the requested access.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENTS

Figure 1:
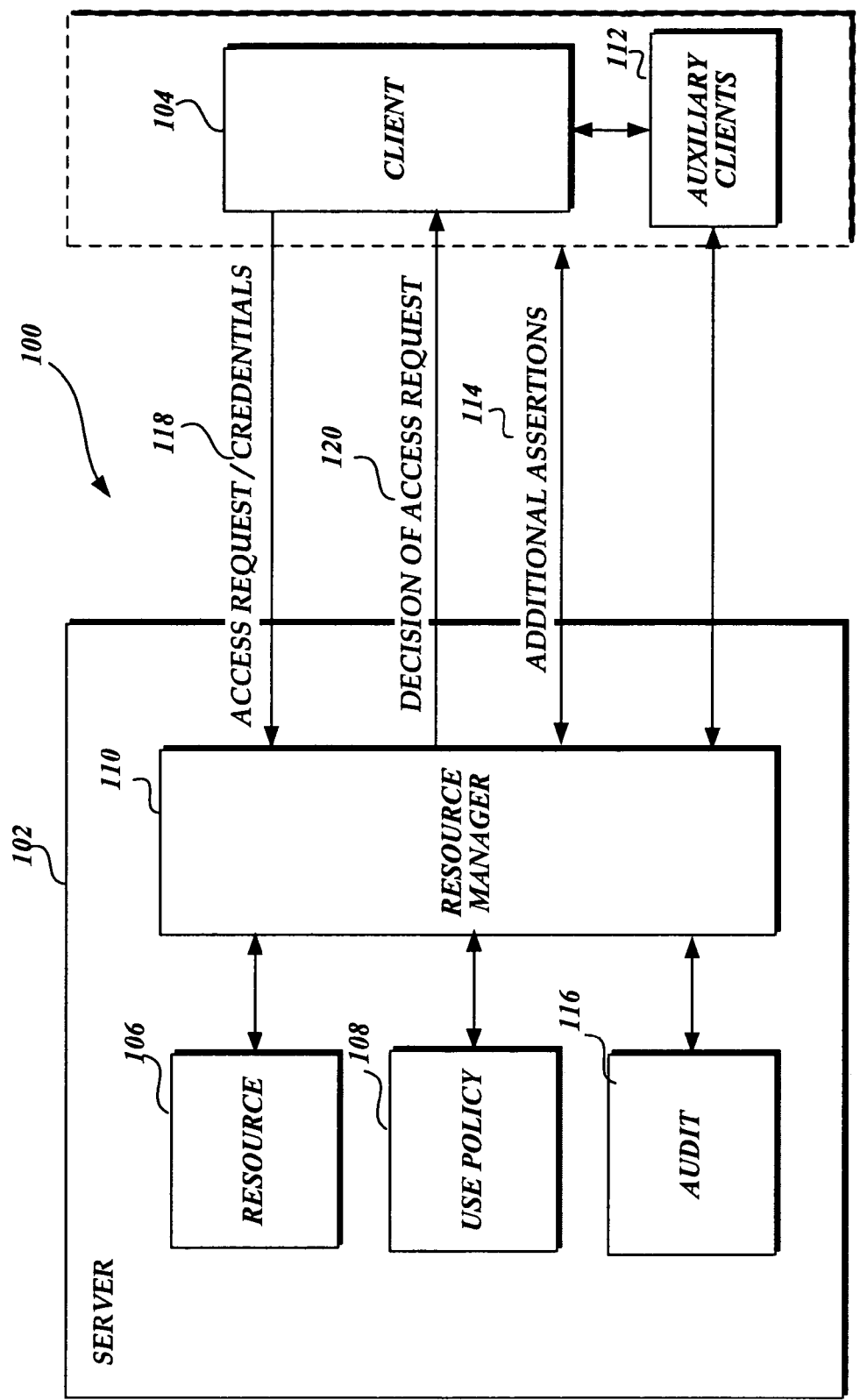
FIG. 1 is a block diagram illustrating an exemplary system for implementing aspects of the invention.

FIG. 1 is a block diagram illustrating an exemplary system 100 that implements aspects of the invention. As shown in FIG. 1, the system 100 includes a server 102 component ("server") and a client 104 component ("client"), and optionally one or more auxiliary clients 112. The server 102 includes at least one resource 106 and a corresponding use policy 108 that dictates who can access the resource 106. The server 102 may further include a resource manager 110 that examines access request and credentials 118 submitted by the client 104 and/or the auxiliary clients 112. The client 104 is any entity that requests to access the resource 106 on the server 102.

The system 100 may be supplemented by one or more auxiliary clients 112. An auxiliary client 112 can supply information to either the server 102 or the client 104. For example, if the client 104 is a company, an auxiliary client 112 can be a subsidiary or a partner of the company. In exemplary embodiments of the invention, an auxiliary client 112 may have its own associates, each of which may also have its own associates, and so on. All the different layers of associates are considered aggregately the auxiliary clients 112.

The client 104 sends to the resource manager 110 an access request and/or credentials 118 for accessing the resource 106. The credentials, i.e., the credential statements, are used to prove that the client 104 is eligible to access the resource 106. The credential statements may be supplied by the client 104 and/or one or more auxiliary clients 112. An auxiliary client 112 may send credential statements to the client 104 or directly to the server 102. The resource manager processes the received access request and credentials 118 and decides whether to grant the requested access according to the use policy 108. The resource manager then sends a decision 120 concerning the access request back to the client 104.

Figure 4:
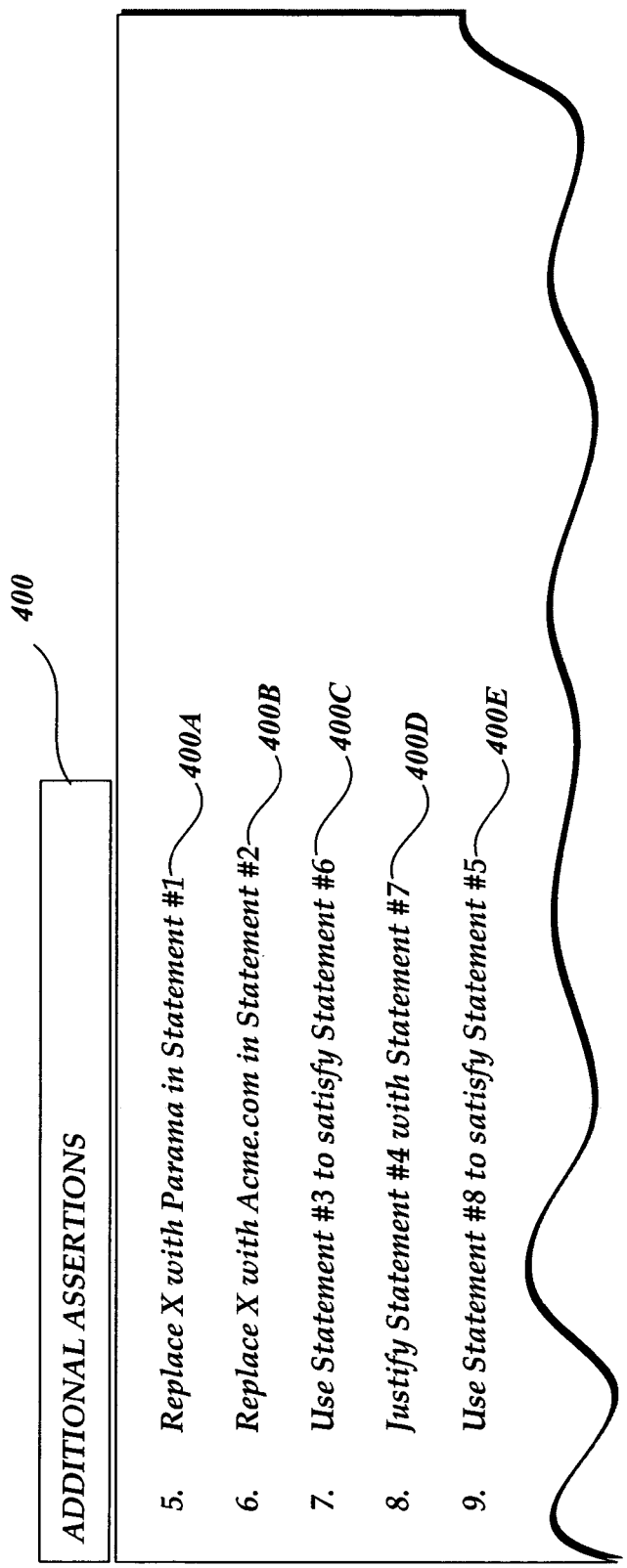
FIG. 4 is a textual diagram illustrating exemplary additional assertions that help the proof of an access request.

More importantly, in exemplary embodiments of the invention, the system 100 also includes additional assertions 114. The additional assertions may be provided to the server 102 by the client 104 and/or one or more auxiliary clients 112. In such a situation, the additional assertions 114 will instruct the resource manager 110 on how to process the received credentials to satisfy the requirements specified by the use policy 108. In some exemplary embodiments of the invention, the additional assertions 114 can be supplied by the resource manager 110 to the client 104 upon the resource manager 110 receiving an access request from the client 104. The client 104 uses the additional assertions 114 to construct a proof for requesting access to the resource 106. The additional assertions 114 relieve the resource manager 110 from computing a proof for deciding whether to grant an access request. Instead, the additional assertions 114 enable the resource manager to only examine the correctness of a proof. FIG. 4 illustrates exemplary additional assertions and will be described in detail later.

The system 100 is only an exemplary implementation to illustrate where the invention is applicable. Components of the system 100 may exist on a single computer system or distributed over a network. Generally speaking, the system 100 can exist in any context where a component such as the server 102 needs another component such as the client 104 to provide information to make a decision such as the decision 120 to grant requested access to the resource 106. Such a context includes, for example, a server machine to another server machine, a client machine to another client machine, two entities within the same machine, and two different processes within a trusted network. In summary, the invention is applicable anywhere where one entity needs information from another entity in order to make a decision.

Exemplary embodiments of the invention use access control languages that represent use policy, credential statements, and assertions in a logic form, as opposed to merely data. In a distributed access control system, the client 104 may delegate multiple layers of auxiliary clients 112 to issue credential statements necessary for requesting access to a resource. If data were used for credential statements, at each level of transferring the data from one entity to another entity, the meaning of the data needs to be examined and computed. On the other hand, if the credential statements were represented in logical formats, the distributed access control system will be able to scale smoothly and infinitely since the expression of a credential statement reveals the inherent meaning.

In exemplary embodiments of the invention, statements such as use policy statements and credential statements employ three concepts that are widely used in many access control languages. The first concept is the use of variables in a policy statement. For example, the use policy 108 for the resource 106 may state that "Parama can read X," where the variable "X" represents a universally quantified variable, i.e., the variable X can take any value. A policy statement may also include constraints limiting the values that a variable X can take. For example, the use policy 108 may state that "Parama can read X where X is a text file." The second concept utilized by statements in the invention is that a policy statement has the ability to specify who can authorize credential statements or assertions for accessing a resource. For example, the use policy 108 may state that "acme.com can make assertions permitting access to the resource 106." Statements in exemplary embodiments of the invention also employ the third concept, which allows a statement to predicate assertions based upon other assertions. For example, the use policy 108 may state that "Parama can access the resource 106, provided that Parama is a Company A employee, according to Company A."

In an exemplary embodiment of the invention, the client 104 and/or one or more of the auxiliary clients 112 may possess the relevant credential statements. Alternatively, the credential statements may be stored somewhere else. Then only references to the credential statements are sent to the server 102.

FIGS. 2-5 illustrate an exemplary use policy statement 200, credential statements 300, additional assertions 400, and integrated statements 500 that integrate the use policy statement 200, the credential statements 300, and the additional assertions 400. The exemplary statements used in FIGS. 2-5 represent or combine the three concepts described above. FIGS. 2-5 will be described with reference to FIG. 1. The entities used in these exemplary statements reflect exemplary components of the system 100. For example, Contosa.com may be the server 102; Parama may be the client 104 requesting to access Web service on Contosa.com; Fabrikam.com and the Fabrikam.com partner Acme.com may be the auxiliary clients 112.

Figure 2:
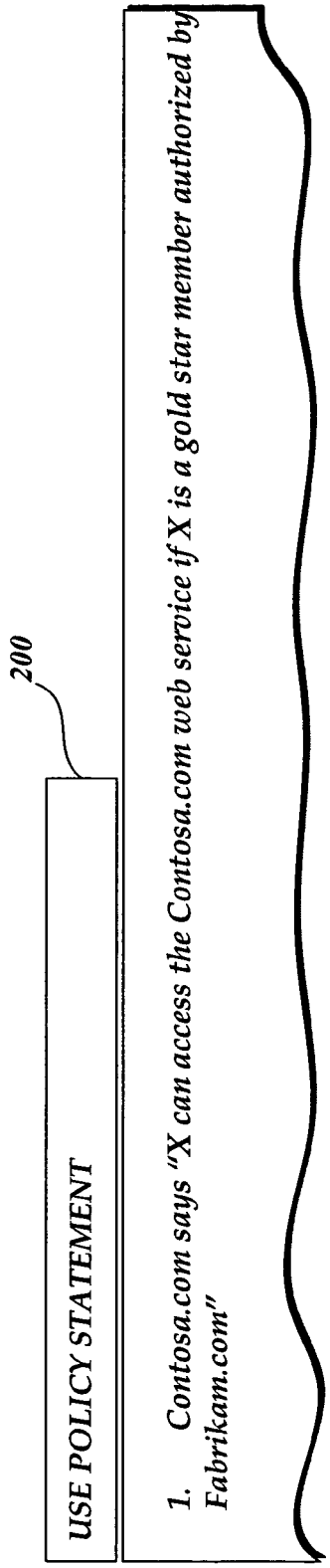
FIG. 2 is a textual diagram illustrating an exemplary use policy statement.

FIG. 2 illustrates one exemplary use policy statement 200 that may be supplied by a use policy such as the use policy 108. The use policy statement 200 recites: Contosa.com says "X can access the Contosa.com Web service if X is a gold star member authorized by Fabrikam.com." Assume X is a client requesting to access the Contosa.com Web service. According to the use policy statement 200, if X can prove that it is a gold star member authorized by Fabrikam.com, then X can gain access to the Contosa.com Web service.

Figure 3:
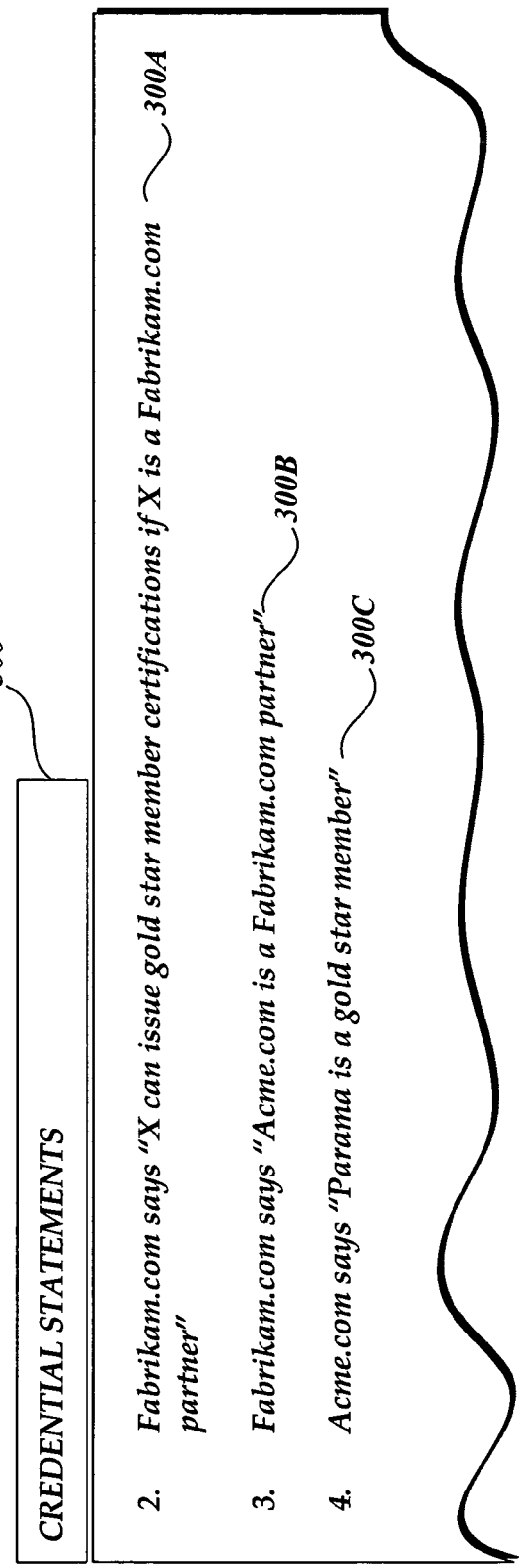
FIG. 3 is a textual diagram illustrating exemplary credential statements supplied by a client.

In a distributed access control system such as the system 100, when the level of distribution increases, the server 102 may not know the client 104. The server 102 may rely on other entities to make statements about a client. Therefore, credential statements that a server 102 receives from a client 104 may contain credential statements supplied by several entities, including the client 104 and/or one or more auxiliary clients 112. FIG. 3 illustrates a set of credential statements 300 that the server Contosa.com may receive from the client Parama and/or the auxiliary clients Fabrikam.com and Acme.com. As shown in FIG. 3, the credential statement 300A recites: Fabrikam.com says "X can issue gold star member certifications if X is a Fabrikam.com partner." This statement also implies that Fabrikam.com designates who Fabrikam.com partners are. The credential statement 300B recites: Fabrikam.com says "Acme.com is a Fabrikam.com partner." The credential statement 300C recites: Acme.com says "Parama is a gold star member."

Now assume Parama makes an access request to Contosa.com and presents the credential statements 300. Conventionally, the resource manager of Contosa.com needs to work through the use policy statement 200 and the credential statements 300 to compute a proof on whether Parama should or should not have the requested access. The resource manager looks through each of the credential statements in order to decide which credential statement is applicable to the use policy. The credential statements provide a cascading logic that enables the resource manager to make the decision. The computing process performed by the resource manager can get arbitrarily complicated if the resource manager receives many credential statements, which can happen, for example, when many layers of auxiliary clients are involved in providing credential statements for Parama. When there are many credential statements, it becomes intractable for the server to arrange the credential statements in a way to induce the proof. Most likely, the computing process may never end. The server 102 can potentially need unbounded search space and cannot know a priori how long it actually takes to figure out whether to grant the requested access or not.

One aspect of the invention addresses this issue by providing additional assertions that instructs on how to construct a proof, using the relevant credential statements. For example, an assertion can assign a value to a variable in a use policy statement. An assertion can also instruct the proof of one prerequisite clause in a user policy statement. FIG. 4 illustrates exemplary additional assertions 400 that the exemplary client Parama may supply to the exemplary server Contosa.com. As shown in FIG. 4, the assertion 400A recites: Replace X with Parama in Statement #1. The assertion 400B recites: Replace X with Acme.com in Statement #2. The assertion 400C recites: Use Statement #3 to satisfy Statement #6. The assertion 400D recites: Justify Statement #4 with Statement #7. The assertion 400E recites: Use Statement #8 to satisfy Statement #5.

The additional assertions 400 advise a resource manager of Contosa.com how to put the credential statements 300 together to arrive at a proof. As a result, instead of facing the potentially undetermined amount of work to establish whether Parama can access the Contosa.com Web service by searching through all species of possible consequences for the credential statements 300, the resource manager of Contosa.com Web service now only needs to follow the instructions in the additional assertions 400 explicitly. The additional assertions thus enable the invention to provide a systematic and efficient way to process use policy and credential statements to arrive at a proof.

Figure 5:
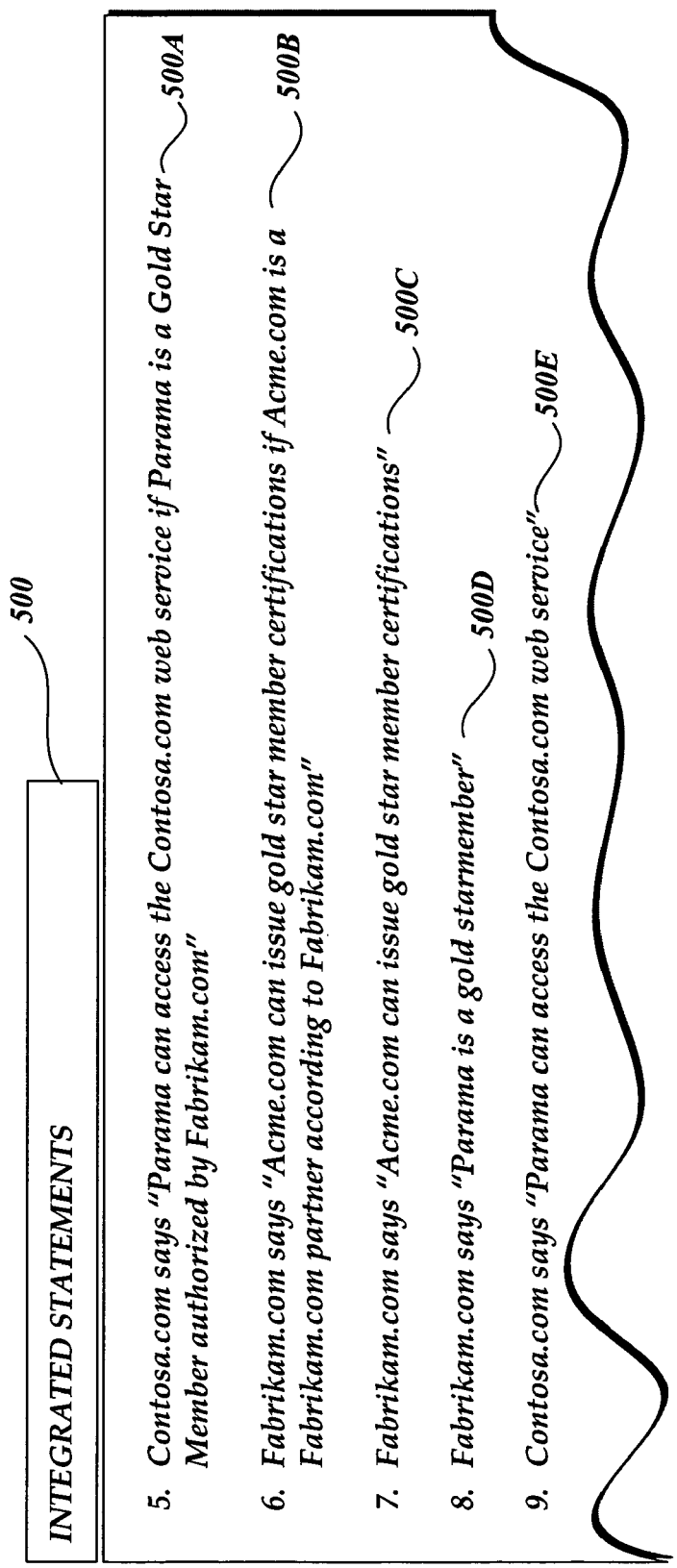
FIG. 5 is a textual diagram illustrating exemplary integrated statements that are results of integrating the use policy statement illustrated in FIG. 2, the credential statements illustrated in FIG. 3, and the additional assertions illustrated in FIG. 4.

FIG. 5 illustrates the integrated statements 500 resulted from a resource manager of Contosa.com executing the instructions in the additional assertions 300 on the user policy statement 200 and the credential integrated statement 300. As shown in FIG. 5, the integrated statement 500A recites: Contosa.com says "Parama can access the resource if Parama is a gold star member authorized by Fabrikam.com." The integrated statement 500B recites: Fabrikam.com says "Acme.com can issue gold star member certifications if Acme.com is a Fabrikam.com partner according to Fabrikam.com." The integrated statement 500C recites: Fabrikam.com says "Acme.com can issue gold star member certifications." The integrated statement 500D recites: Fabrikam.com says "Parama is a gold star member." The integrated statement 500E thus concludes: Contosa.com says "Parama can access the Contosa.com Web service."

Therefore, a resource manager for the exemplary server Contosa.com can use the additional assertions 400 to conclude in a straightforward fashion that Contosa.com has implicitly authorized Parama access to the Contosa.com Web service. When applying each of the additional assertions 400, all Contosa.com needs to check is that it is possible to apply this assertion. In other words, the entity presenting the assertions cannot make Contosa.com do something that is not implied by the use policy statement 200 and the credential statements 300.

Additional assertions can be provided to either a server or a client. Upon receiving additional assertions from a client or auxiliary clients, a resource manager of a server uses the additional assertions to construct a proof and then examines the proof instead of computing the proof. In exemplary embodiments of the invention, as soon as a server receives and reads through a set of credential statements and additional assertions, the server can figure out whether to grant the requested access request or not.

Alternatively, a server can supply additional assertions to a client. Upon receiving an access request from a client, the server can reply with a proposition. The proposition may include additional assertions to instruct the client on how to construct a proof for the server in order to obtain the requested access. Thus, the server will receive from the client the needed proof. All the server needs to do is to examine the proof to determine whether the proof provides a valid conclusion according to the use policy associated with the requested resource.

In exemplary embodiments of the invention, a server does not have to trust the proof supplied by a client. The server can check the veracity of the credential statements and the additional assertions. This means that the credential statements and the additional assertions do not have to come from trusted entities, because a resource manager of the server cannot be tricked into believing non-proofs to be proofs. The steps that an assertion asks a resource manager to perform should only create actions that are already implied, such as replacing variables in the use policy. Therefore, a client cannot lie to a server to induce the server to arrive at a proof that is false. If an additional assertion supplied is false, the server cannot find the proof. Additional assertions can only help the server make the proof, but cannot trick the server to make a fake proof. If an additional assertion is false, the server will not be able to arrive at a proof. This is analogous to navigating a maze. Computing a proof is like finding a path out of a maze, which may be difficult. On the contrary, verifying whether a given path is a correct path is much easier: If the given path leads to an exit of the maze, then the given path is a correct path. Additional assertions are equivalent to a "given path." A set of given additional assertions is correct if they lead the server to arrive at a proof; the set of given additional assertions is incorrect and disregarded if the server cannot arrive at a proof by using them.

In exemplary embodiments of the invention, the additional assertions provided by a server or a client may only make a partial proof, instead of the whole proof that is necessary for deciding on whether to grant the requested access. For example, a server may decide not to reveal its use policy to any entity. Consequently, the server only supplies additional assertions that enable a client to prove the client's identity as required by the hidden user policy. For instance, Contosa.com may decide not to reveal the use policy statement 200. Therefore, Contosa.com requires the exemplary client Parama to prove that it is a gold star member authorized by Fabrikam.com, with the client having no knowledge about the use policy statement 200. Alternatively, a server is associated with a traditional theorem prover that is subject to the danger of endless computing mentioned previously with theorem proving. To alleviate such a danger, the additional assertions can be used to construct the "difficult" parts of the proof, leaving a simple (and safe) variant of traditional theorem proving to fill in the minor gaps. In such an approach, theorem verification and proving work together to provide a safe and expressive computation of proof.

In an exemplary embodiment of the invention, the server 102 illustrated in FIG. 1 also includes an audit component 116. The audit component 116 logs and saves a resource manager's reasoning process for granting or not granting a requested access. Information recorded by the audit component 116 may identify the reasoning process and/or the various statements the resource manager processes to arrive at the conclusion. Therefore, the auditing information may reveal not only who accessed the resource, but also why the access was granted. The auditing information is useful for analyzing how the access control system works, who requested a resource, why the request was granted, and how the requests were granted. For example, the audit information may provide that Parama has requested access to a Contosa.com Web service and that the access was granted because Parama was proven to be a gold star member authorized by Fabrikam- .com. In an exemplary embodiment of the invention, the audit information includes the set of additional assertions used.

Figure 6:
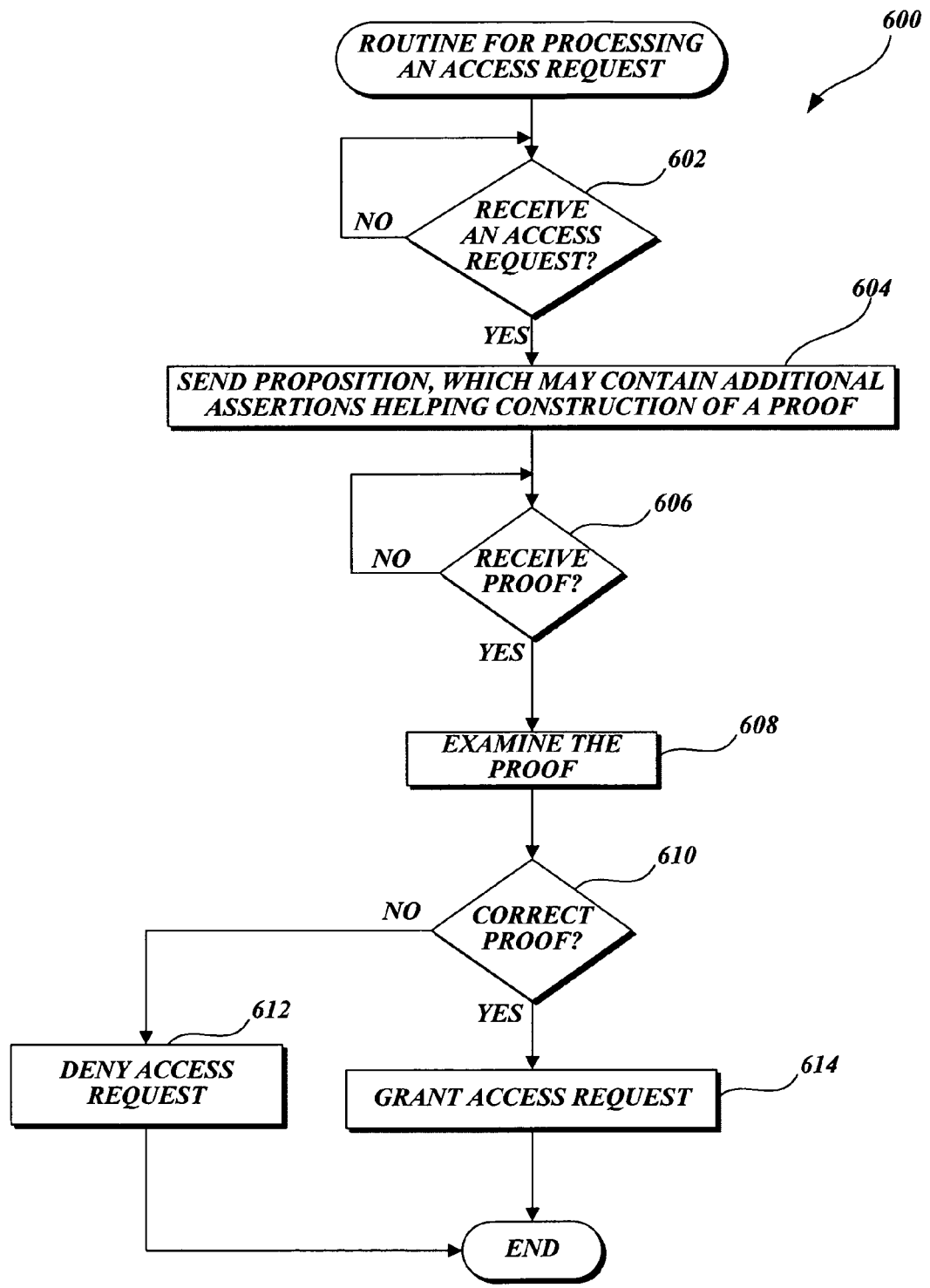
FIG. 6 is a flow diagram illustrating an exemplary routine for a server to process an access request.

FIG. 6 illustrates an exemplary routine 600 where a server, such as the server 102, processes an access request and reaches a decision on whether to grant the access request. Specifically, the routine 600 starts by determining whether the server has received an access request. See decision block 602. If the server has not received an access request, the routine 600 does not proceed further. If the server has received an access request, the routine 600 proceeds to reply with a proposition that a server wants the client sending the access request to prove before granting the client the requested access. See block 604. The proposition may identify the use policy for the requested resource. The proposition may also include a proof structure that identifies the relationships among multiple use policy statements and any variable in these use policy statements. The proposition may further include additional assertions that instruct the client on how to substantiate the proof structure. For example, the additional assertions may suggest to a client how to satisfy a condition in a use policy statement and/or to find a specific value for a variable in a use policy statement.

The routine 600 then waits to receive a proof from the client in response to the proposition. The routine 600 determines whether it has received such a proof. See decision block 606. If the answer to decision block 606 is NO, the routine 600 proceeds no further. If the routine 600 receives a proof from the client, the routine 600 proceeds to examine the proof. See block 608. In examining the received proof, the routine 600 determines whether the proof is correct. See decision block 610. A correct proof demonstrates that the client has the right to access the requested resource and that the proof constitutes true statements. If the answer to decision block 610 is YES, meaning that the received proof is correct, the routine 600 proceeds to grant the access request. See block 614. On the other hand, if the answer to decision block 610 is NO, meaning the received proof is incorrect, the routine 600 denies the access request. See block 612. The routine 600 then terminates.

Figure 7:
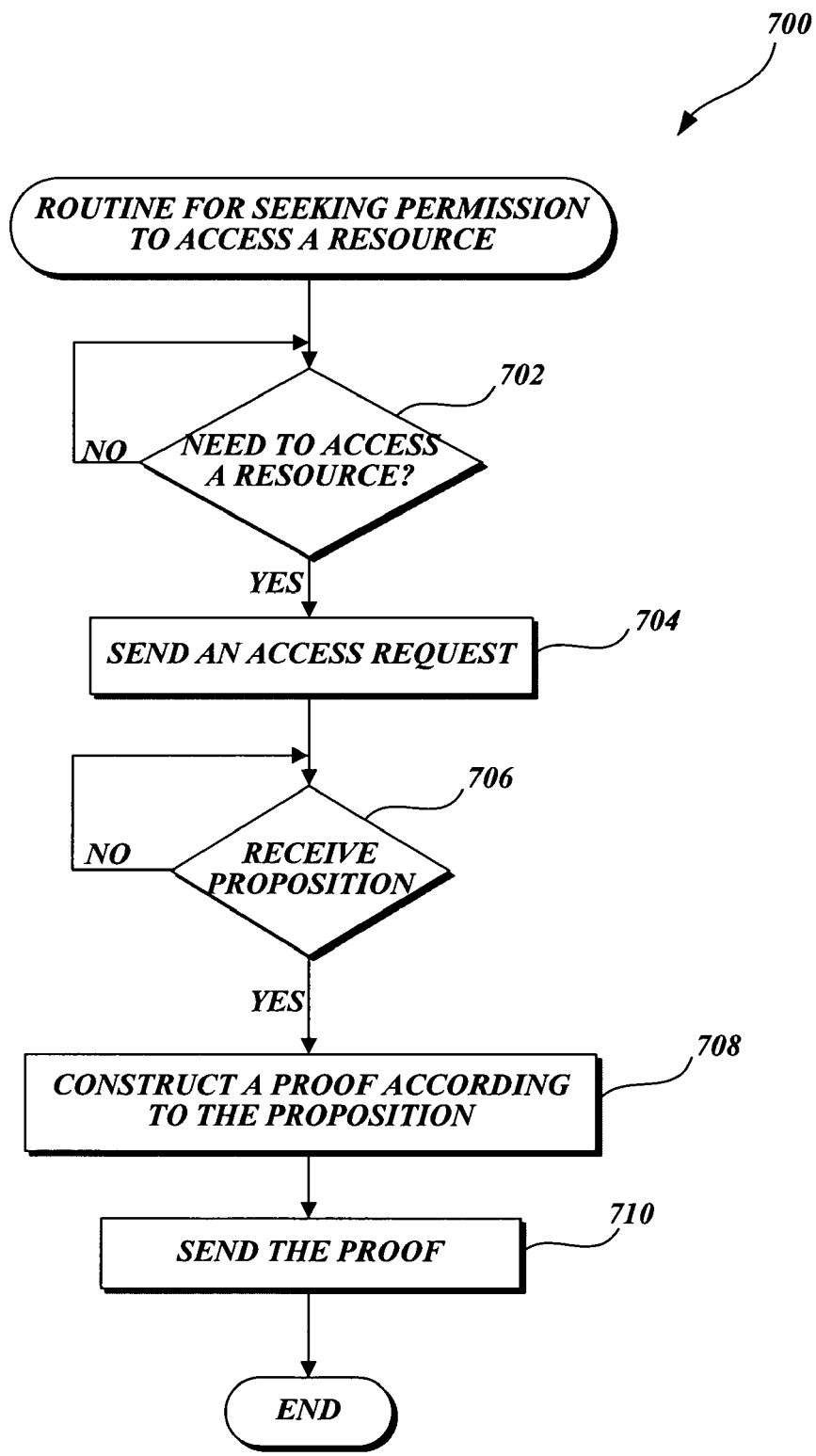
FIG. 7 is a flow diagram illustrating an exemplary routine for a client to seek permission to access a resource on a server.

FIG. 7 illustrates an exemplary routine 700 where a client seeks permission from a server to access a resource of the server. Specifically, the routine 700 starts by determining whether the client wants to access a resource of a server. See decision block 702. If the answer is NO, the routine 700 does not proceed further. If the client wants to access a resource of a server, the routine 700 sends an access request to the server. See block 704. The routine 700 then waits to receive a proposition from the server. The routine 700 determines if a proposition has been received. See decision block 706. If the answer is NO, the routine 700 does not proceed further. If the client does receive a proposition from the server, the routine 700 proceeds to construct a proof, according to the proposition. See block 708. The proof includes data and logical steps that satisfy the requirements specified in the proposition. If the proposition contains additional assertions that instruct how to construct the proof, the proof will be constructed in accordance with the additional assertions. In the case that the received proposition does not contain additional assertions, the constructed proof includes credential statements that identify who the client is. The constructed proof may also include additional assertions that instruct the server on how to use the supplied credential statements to arrive at a decision on whether to grant the access request. The routine 700 then sends the constructed proof to the server. See block 710. The routine 700 ends. In an exemplary embodiment of the invention, if the client knows beforehand what the server needs in order to make a decision on an access request, when sending the access request to the server, the client also supplies the necessary credential statements and additional assertions. As a result, the server has no need to send the proposition.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A system employing an access control language that uses logic forms including variables and prerequisite clauses, comprising:
    a server machine linked to at least one resource and an associated use policy of the resource, the use policy containing logic forms including variables and prerequisite clauses that have to be proved correctly for accessing the resource;
    one or more entities configured to send credential statements and additional assertions;
    wherein at least one of the one or more entities is a client machine for requesting access to the resource; wherein the additional assertions contain instructions describing how to put the credential statements together to construct at least a partial proof to satisfy the use policy of the requested resource and thereby allow the server machine to grant the client machine access to the requested resource;
    wherein the server machine is configured to receive at least one credential statement concerning the client machine from a supplier selected from a group consisting of the client machine and at least one auxiliary client; and
    wherein the at least one credential statement is stored at a location other than the supplier, and the supplier is configured to reference the at least one credential statement while supplying the at least one credential statement to the server machine.

2. The system of claim 1, wherein the client machine is not a trusted entity.

3. The system of claim 1, wherein at least one of the one or more entities is an auxiliary client.

4. The system of claim 3, wherein the at least system is configured to construct the partial proof only after all credential statements and additional assertions are received.

5. The system of claim 1, wherein the one or more additional assertions contain instructions for substituting a variable with a value.

6. The system of claim 1, wherein the one or more additional assertions contain instructions for proving at least one prerequisite clause.

7. The system of claim 1, wherein the one or more additional assertions contain instructions for recursive proofing of prerequisite clauses.

8. The system of claim 1, wherein the one or more additional assertions instruct the client machine how to construct the partial proof.

9. The system of claim 1, wherein the one or more additional assertions can be used by the server machine to instruct the server machine how to put the credential statements together to construct at least the partial proof.

10. The system of claim 1, wherein the server machine further includes an audit component configured to record why the requested access is granted or denied.

11. The system of claim 10, wherein the audit component is configured to record the partial proof.

* * * * *